US007303036B2

(12) United States Patent
MacConney et al.

(10) Patent No.: US 7,303,036 B2
(45) Date of Patent: Dec. 4, 2007

(54) ENGINE GOVERNOR SYSTEM

(75) Inventors: Michael S. MacConney, Evans, GA (US); Matthew D. Wilson, Augusta, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/470,264

(22) Filed: Sep. 6, 2006

(65) Prior Publication Data

US 2007/0017481 A1 Jan. 25, 2007

Related U.S. Application Data

(62) Division of application No. 10/731,744, filed on Dec. 9, 2003, now Pat. No. 7,111,699.

(51) Int. Cl.
*B60K 31/00* (2006.01)

(52) U.S. Cl. ........................ 180/170; 180/168; 123/376

(58) Field of Classification Search ................ 180/170, 180/168, 167, 281, 197, 65.8; 123/376, 399, 123/400, 363, 481; 74/513, 512; 477/78, 477/120

See application file for complete search history.

(56) References Cited

U.S. PATENT DOCUMENTS

| | | | |
|---|---|---|---|
| 4,181,103 | A | 1/1980 | Sturdy |
| 4,361,060 | A | 11/1982 | Smyth |
| 4,774,832 | A | 10/1988 | Smyth |
| 4,986,238 | A | 1/1991 | Terazawa et al. |
| 5,293,316 | A | 3/1994 | Slicker |
| 5,477,116 | A | 12/1995 | Journey |
| 5,556,441 | A | 9/1996 | Courtwright et al. |
| 5,570,751 | A | 11/1996 | Courtwright et al. |
| 5,570,757 | A | 11/1996 | Courtwright et al. |
| 5,835,868 | A | 11/1998 | McElroy et al. |
| 5,836,412 | A | 11/1998 | Lyles et al. |
| 5,980,428 | A | 11/1999 | Liu |
| 6,019,015 | A | 2/2000 | Elton |
| 6,019,202 | A | 2/2000 | Anwar |
| 6,060,981 | A | 5/2000 | Landes |
| 6,123,163 | A | 9/2000 | Otsu et al. |
| 6,253,731 | B1 | 7/2001 | Yoon et al. |
| 6,612,286 | B1 | 9/2003 | Houston |
| 6,808,471 | B1 | 10/2004 | Bauerle et al. |

FOREIGN PATENT DOCUMENTS

| | | | |
|---|---|---|---|
| EP | 0322790 | A | 7/1989 |
| EP | 0355967 | A | 2/1990 |
| EP | 0904970 | A | 3/1999 |

*Primary Examiner*—Hau Phan
(74) *Attorney, Agent, or Firm*—Harness, Dickey & Pierce P.L.C.

(57) ABSTRACT

A governor system for limiting the ground speed of a vehicle and maintaining an idle speed of the engine. The governor system includes a first feedback shaft operably coupled with a transmission of the vehicle to provide a first feedback torque in response to a ground speed of the vehicle. A second feedback shaft is operably coupled with the engine to provide a second feedback torque in response to a revolutionary speed (RPM) of the engine. A ground speed governor system is coupled between the first feedback shaft and the throttle system of the engine for limiting operation of the throttle system in response to the first feedback torque, thereby limiting ground speed. An idle speed governor system is coupled between the second feedback shaft and the throttle system of the engine for actuating the throttle system in response to the second feedback torque, thereby maintaining a desired idle speed.

13 Claims, 4 Drawing Sheets

ENGINE GOVERNOR SYSTEM

CROSS-REFERENCE TO RELATED APPLICATIONS

This application is a divisional of U.S. patent application Ser. No. 10/731,744 filed on Dec. 9, 2003 now U.S. Pat. No. 7,111,699. The disclosure of the above application is incorporated herein by reference.

FIELD OF THE INVENTION

The present invention relates to gasoline-powered vehicles and, more particularly, relates to governor systems for gasoline-powered vehicles.

BACKGROUND OF THE INVENTION

Many vehicles, such as golf cars, include a ground speed governor system for limiting the degree of throttle to correspondingly limit the speed at which the vehicle may travel. Typically, these vehicles include an engine, a transmission, and a drive axle receiving drive torque from the engine through the transmission. Generally, ground speed governor systems include a plurality of weights disposed about an input shaft of the drive axle, which are configured to pivot away from the input shaft because of the centrifugal forces generated by the angular velocity of the input shaft. The weights pivot outward against a set of sliding spacers, which in turn actuate a ground speed governor shaft extending inside the drive axle. As the angular velocity of the input shaft increases so does the centrifugal force resulting in a torque produced through the ground speed governor shaft. Thus, the torque produced through the ground speed governor shaft is linear and directly proportional to the angular velocity of the input shaft.

A ground speed control mechanism, or governor system, is provided to limit the maximum vehicle speed. Traditional ground speed governor systems include a control arm with a spring assembly, an accelerator cable input interconnecting the accelerator pedal, and a throttle output interconnecting the throttle. The spring assembly includes a threaded rod, a pivot bracket, a compression spring, spring retainers, and an adjustment nut. The governed speed is preset by the manufacturer by adjusting the compression of the spring with the adjustment nut.

When the accelerator pedal is actuated, the accelerator cable pulls on the spring, which in turn applies a force to the control arm. The control arm then rotates and actuates the throttle linkage to open the throttle. As the accelerator is depressed and the vehicle accelerates, the torque exerted on the control arm by the ground speed governor shaft correspondingly increases. When this torque becomes greater than that produced by the spring assembly, the control arm rotates, compressing the spring further, thereby relieving the throttle linkage to enable closure of the throttle. As the vehicle slows, the torque exerted on the control arm by the ground speed governor shaft correspondingly decreases, enabling the control arm to rotate, thereby actuating the throttle linkage to again open the throttle. The result is a relatively constant vehicle speed, regardless of load.

Separately, small engines such as those discussed above often suffer from engine idle speed problems. For example, when the vehicle is traveling quickly and the accelerator pedal is released, occasionally the engine speed can drop rapidly causing the engine to stall. To overcome this problem, attempts have been made to use an engine idle speed governor. However, traditionally it has been necessary to choose between using a ground speed governor system or an engine idle speed governor system as each was mutually exclusive relative to the other—each attempting to actuate the throttle in an opposite direction. However, it is readily apparent that having the ability to governor both the vehicle ground speed and the engine idle speed is desirable in many applications.

Therefore, it is desirable in the industry to provide an improved governor system capable of governing both the ground speed of the vehicle to prevent over-speeding of the vehicle and the engine speed to prevent stalling of the engine. The improved governor system should be simple in construction, having a reduced number of components over traditional governor systems, for alleviating the disadvantages associated therewith.

SUMMARY OF THE INVENTION

In accordance with the principles of the present invention, a governor system for limiting the ground speed of a vehicle and maintaining an idle speed of the engine having an advantageous construction is provided. The governor system includes a first feedback shaft operably coupled with a transmission of the vehicle to provide a first feedback torque in response to a ground speed of the vehicle. A second feedback shaft is operably coupled with the engine to provide a second feedback torque in response to a revolutionary speed (RPM) of the engine. A ground speed governor system is coupled between the first feedback shaft and the throttle system of the engine for limiting operation of the throttle system in response to the first feedback torque, thereby limiting ground speed. An idle speed governor system is coupled between the second feedback shaft and the throttle system of the engine for actuating the throttle system in response to the second feedback torque, thereby maintaining a desired idle speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
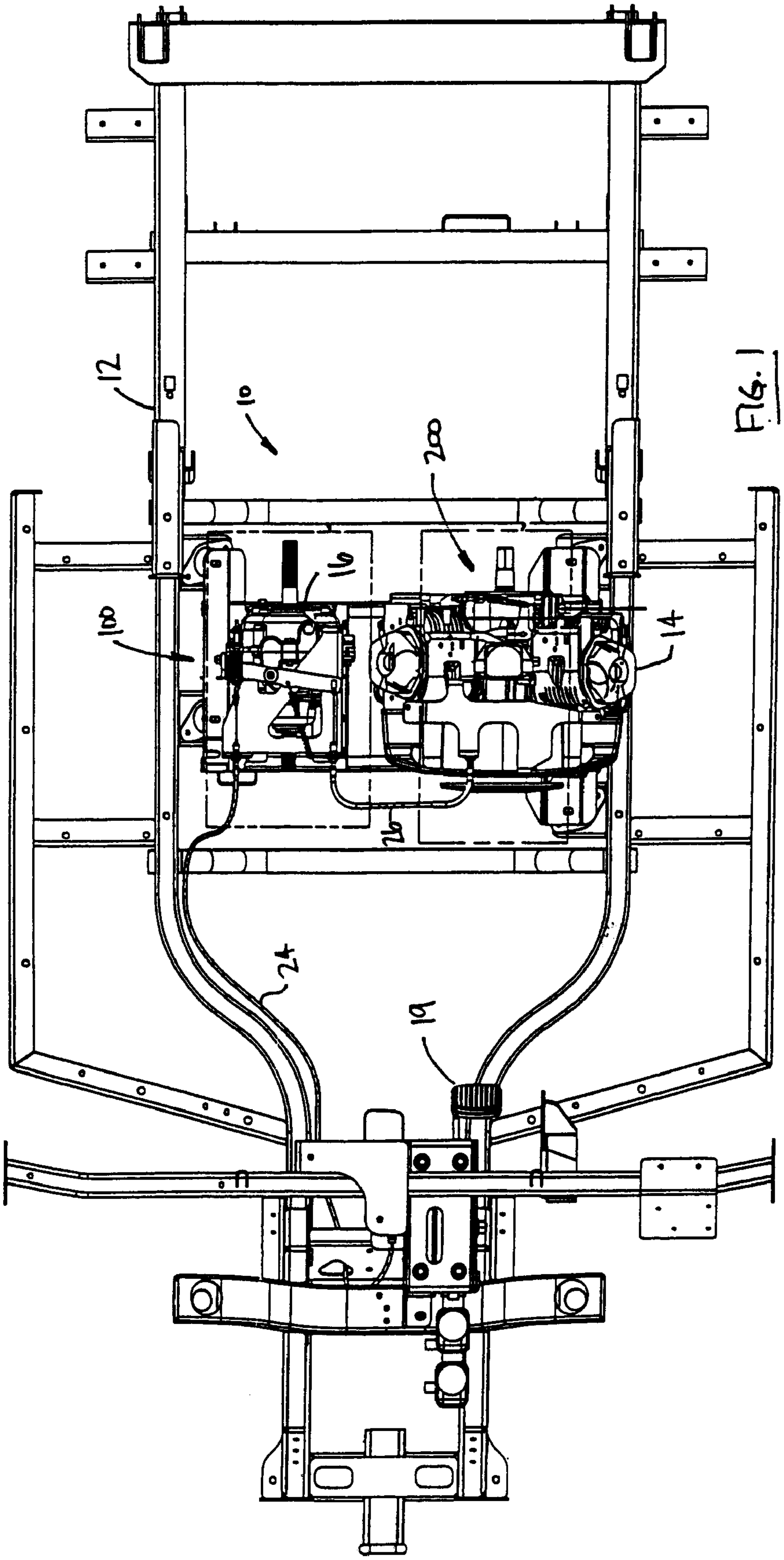
FIG. 1 is a plan view illustrating a vehicle driveline implementing a governor system according to the principles of the present invention.

With reference to FIG. 1, a vehicle driveline 10 is shown supported by a frame 12. Vehicle driveline 10 is preferably that of a golf or utility cart, however, it will be appreciated that the teachings of the present invention are applicable to any type of driveline known in the art. Vehicle driveline 10 includes an engine 14 operably interconnected to a drive transmission 16 for providing drive torque thereto. Drive transmission 16 includes an output shaft 18 extending therefrom for driving a pair of wheels (not shown). A pedal assembly 19 is provided for manipulating a carburetor 20 (FIG. 2) of engine 14 for providing a degree of throttle corresponding to a desired torque output of engine 14. A ground speed governor system 100 is operably coupled to carburetor 20 and the pedal assembly 19 for limiting the degree of throttle, thereby limiting the torque output of engine 14, as discussed in further detail herein below. An accelerator cable 24 interconnects the pedal assembly 19 and ground speed governor system 100. A throttle cable 26 interconnects ground speed governor system 100 and carburetor 20. An engine idle speed governor system 200 is operably coupled to carburetor 20 and an idle governor shaft 210.

Figure 2:
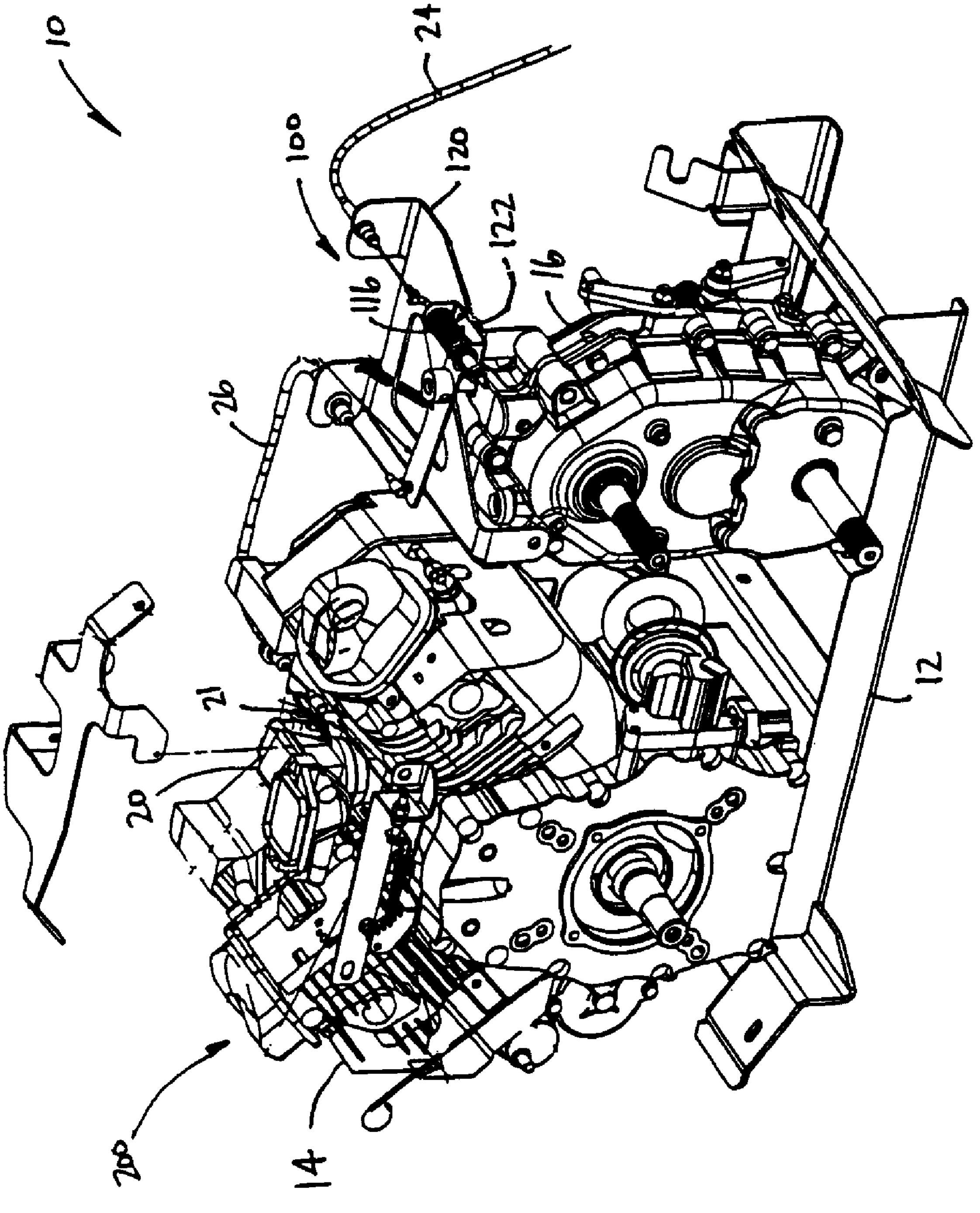
FIG. 2 is a perspective view illustrating the vehicle driveline of the present invention.
Figure 3:
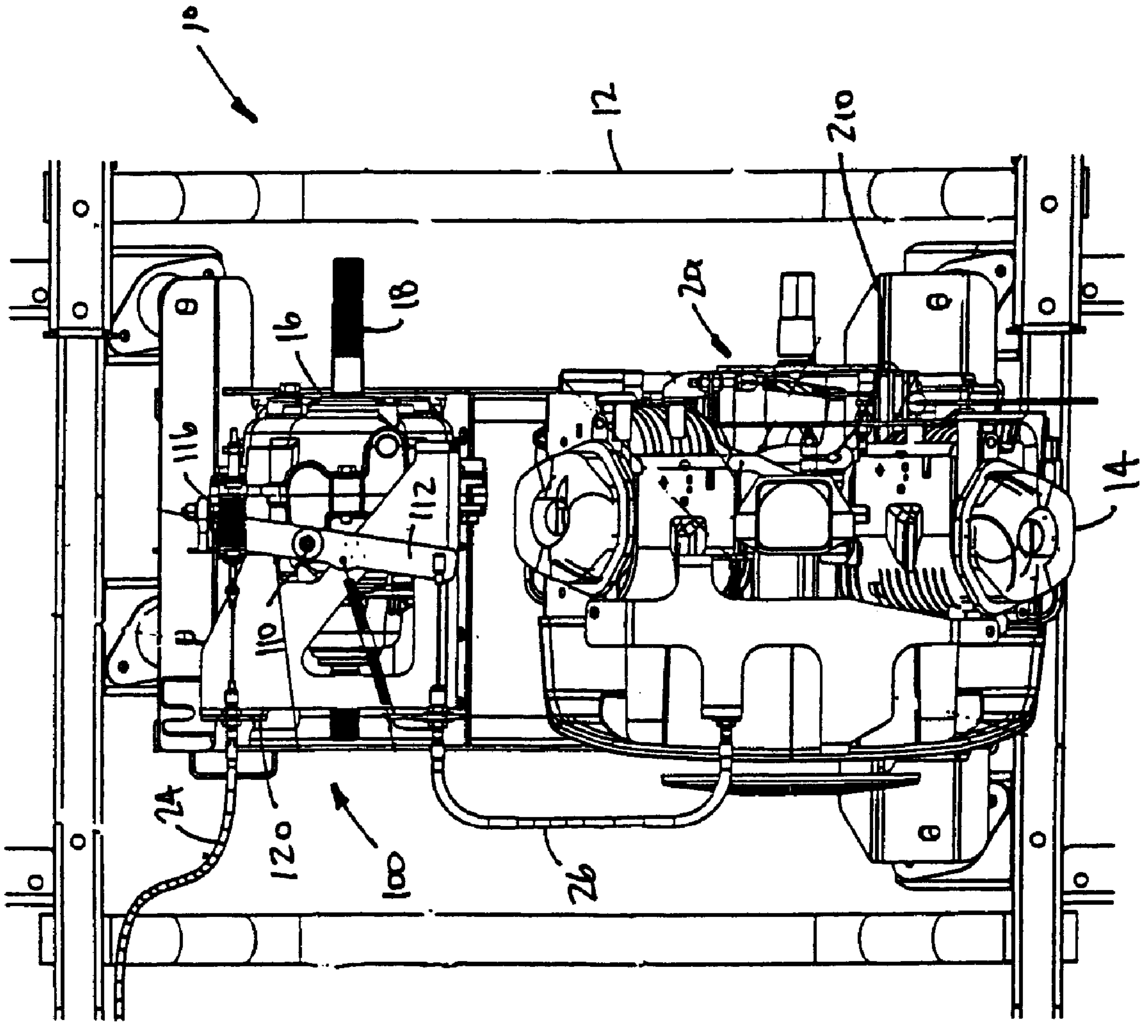
FIG. 3 is an enlarged view illustrating the vehicle driveline of the present invention.
Figure 4:
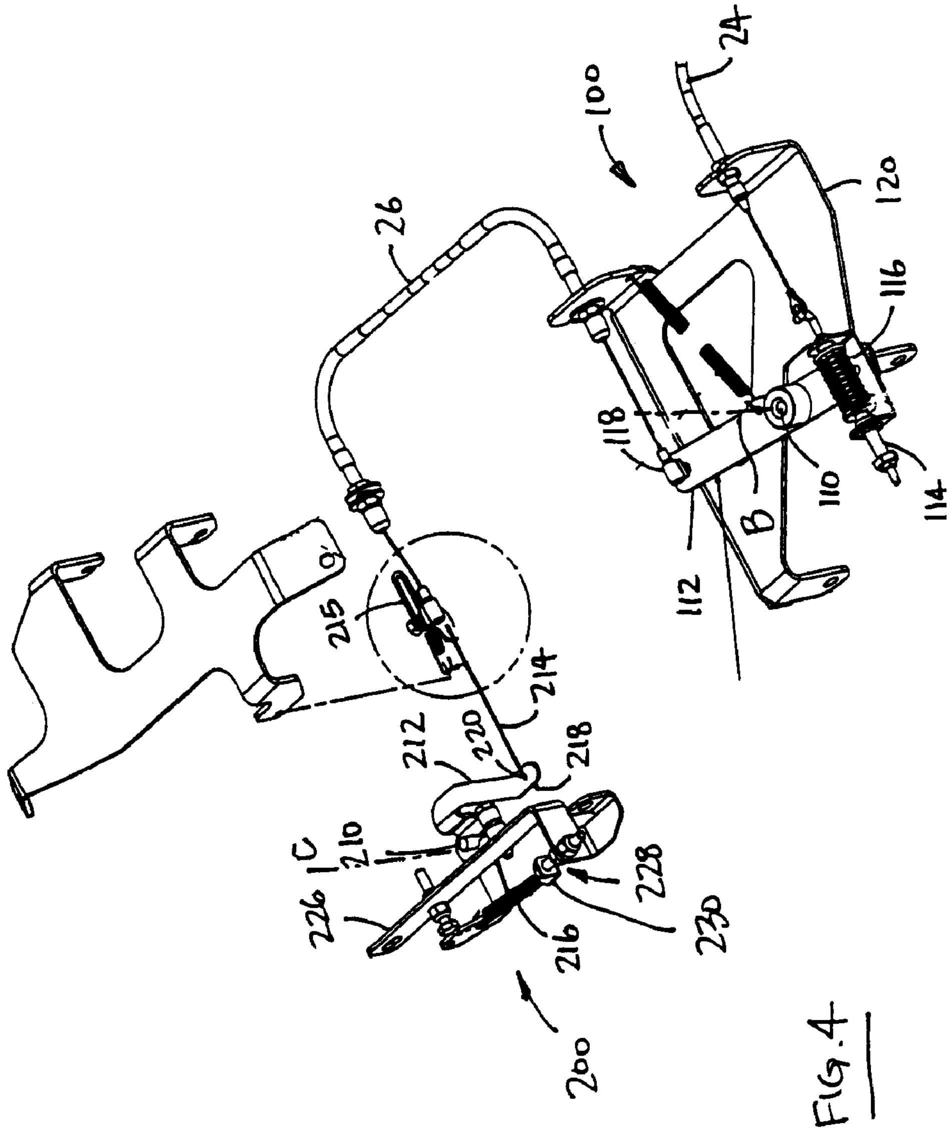
FIG. 4 is a perspective view illustrating the governor system of the present invention having the remaining parts removed for clarity.

Ground speed governor system 100 is coupled to drive transmission 16, intermediately disposed between the pedal assembly 19 and carburetor 20. As best seen in FIGS. 2-4, ground speed governor system 100 includes a governor shaft 110 extending from drive transmission 16, a governor arm 112, a governor rod 114, and a compression spring 116. Governor shaft 110 is operably interconnected to internal components of drive transmission 16 and is rotatable about an axis B. The amount of torque required to rotate governor shaft 110 is controlled by the internal components of drive transmission 16 and is a function of the rotational speed thereof (i.e. vehicle ground speed). Governor arm 112 is fixed for rotation with governor shaft 110 and extends generally perpendicular to the axis B.

A first end of governor arm 112 includes a throttle cable coupling 118 for interconnecting with an end of throttle cable 26. An end of sheathing around throttle cable 26 is retained by a ground speed governor bracket 120 to permit actuation of throttle cable 26. An opposing end of governor arm 112 is interconnected with accelerator cable 24. Specifically, an end of accelerator cable 24 extends through an upturned bracket portion 122 of governor arm 112 and is coupled to governor rod 114. Governor rod 114 is slidably received through upturned bracket portion 122. Compression spring 116 is disposed about governor rod 114 and is positioned between upturned ends of upturned bracket portion 122 for resiliently interconnecting governor rod 114 to governor arm 112.

An end of sheathing around accelerator cable 24 is retained by ground speed governor bracket 120 to permit actuation of accelerator cable 24. As governor rod 114 is caused to pull governor arm 112, thereby rotating governor shaft 110, compression spring 116 is caused to compress as a function of the amount of torque required to rotate governor shaft 110. In other words, the amount of torque required to rotate governor shaft 110, which is a function of the rotational speed of the internal components of drive transmission 16, induces a feedback force, biasing against the pulling force of governor rod 114. In this manner, compression spring 116 is caused to compress, whereby the pulling force of governor rod 114 balances against the feedback force of governor shaft 110 to maintain a maximum vehicle speed.

With reference to FIG. 4, a more detailed description of the operation of ground speed governor system 100 will be provided. In order to induce drive torque output from engine 14, an operator must press the accelerator pedal (not shown) to induce actuation of a throttle linkage 21 (FIG. 5) of carburetor 20 into an infinite number of positions between a fully closed position and a fully opened position. Throttle linkage 21 is biased via a throttle spring 23 into a closed positioned. Such that, upon depression of the accelerator pedal (not shown), a pulling force travels through accelerator cable 24. The pulling force is translated through governor rod 114 and through compression spring 116, ultimately pulling governor arm 112 for inducing rotation thereof about the axis B. Initially, with the vehicle starting from rest, there is no feedback force translated from governor shaft 110 through governor arm 112. Thus, as governor rod 114 applies the pulling force to governor arm 112, through compression spring 116, governor arm 112 is caused to rotate about the axis B with minimal compression of compression spring 116. Rotation of governor arm 112 about the axis B induces a pulling force through throttle cable 26 for manipulating throttle linkage 21 of carburetor 20 to accelerate the vehicle.

As the vehicle speed increases, the rotational speed of the internal components of drive transmission 16 correspondingly increases, thereby inducing the increasing feedback force through governor shaft 110. As the feedback force increases, governor shaft 110 is caused to rotate back about the axis B, thereby rotating governor arm 112 against compression spring 116. Compression spring 116 is caused to compress until a balance is achieved between the pulling force and the feedback force. However, because governor arm 112 rotates back about the axis B until this balance is achieved, the pulling force through throttle cable 26 is somewhat relieved for reducing the degree of throttle, thereby limiting the maximum vehicle speed.

Engine idle speed governor system 200 is operably coupled to engine 14, intermediately disposed between carburetor 20 and idle governor shaft 210. As best seen in FIGS. 2-5, engine idle speed governor system 200 includes idle governor shaft 210 extending from engine 14, an idle governor arm 212, an idle governor link 214, a lost motion slot member 215, and an idle governor spring 216. Idle governor shaft 210 is operably interconnected to internal components of engine 14 and is rotatable about an axis C. The amount of torque required to rotate idle governor shaft 210 is controlled by the internal components of engine 14 and is a function of the rotational speed of engine 14 (i.e. engine rpm's). Idle governor arm 212 is fixed for rotation with idle governor shaft 210 and extends generally perpendicular to the axis C. However, it should be understood that idle governor arm 212 might be shaped into various configurations due to packaging requirements.

A first end of idle governor arm 212 is operably coupled to idle governor link 214 to permit generally linear actuation of idle governor link 214 in response to pivotal actuation of idle governor arm 212. By way of non-limiting example, an end 218 of idle governor link 214 may extend through an aperture 220 formed idle governor arm 212. An opposing end 222 (FIG. 5) of idle governor link 214 is then fixed for linear movement to lost motion slot member 215. Lost motion slot member 215 is generally a planar member having an elongated slot 224 formed therein. Elongated slot 224 is sized to receive throttle linkage 21 of carburetor 20 therethrough to permit throttle linkage 21 to slide relative to lost motion slot member 215 in response to input received from ground speed governor system 100. However, the length of elongated slot 224 is determined to permit engine idle speed governor system 200 to actuate throttle linkage 21 through movement of idle governor link 214.

An idle governor bracket 226 is coupled to engine 14 to provide a rigid support for idle governor spring 216. Accordingly, idle governor spring 216 is coupled between idle governor arm 212 and an adjustment mechanism 228 extending from idle governor bracket 226. Idle governor spring 216 biases idle governor arm 212 into a partially rotated position causing idle governor link 214 to drive lost motion slot member 215 into an engaged position with throttle linkage 21. The specific biasing force of idle governor spring 216 causes a specific driving force exerted upon lost motion slot member 215 and throttle linkage 21 to produce a specific idling revolution per minute (rpm). Therefore, the desired idling rpm can be set by choosing a spring having a specific biasing force and/or adjusting adjustment mechanism 228.

With particular reference to FIG. 4, adjustment mechanism 228 includes a slidable bracket member 230 slidably coupled to idle governor bracket 226. Slidable bracket member 230 is positionable relative to idle governor bracket 226 to vary the biasing force of idle governor spring 216. Accordingly, it should be understood that through the careful selection and/or adjustment of idle governor spring 216 and adjustment mechanism 228, respectively, the desired idle setting could be produced irrespective of engine tolerance buildup and the like.

Figure 5:
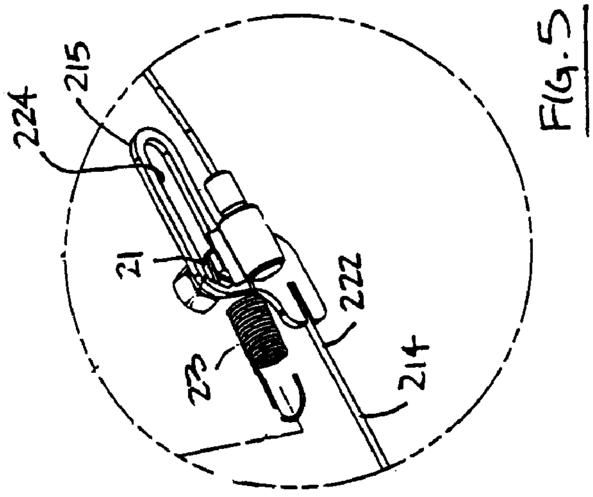
FIG. 5 is an enlarged perspective view illustrating the lost motion slot member of the present invention.

With reference to FIGS. 4-5, a more detailed description of the operation of engine idle speed governor system 200 will be provided. Initially, prior to ignition of engine 14, the internal components of engine 14 are stationary and, thus, exert no force upon idle governor shaft 210. Consequently, idle governor spring 216 biases idle governor arm 212 into a first predetermined throttle position (i.e. starting position) wherein throttle linkage 21 is actuated to at least partially open carburetor 20. This first predetermined throttle position is preferably sufficient to aid in the starting of engine 14 without the need for additional throttle input from the user, although this is not required.

As engine 14 is started, the rotational speed of the internal components of engine 14 begins increasing, thereby inducing an increasing feedback force through idle governor shaft 210 opposing the biasing force of idle governor spring 216. As the feedback force increases, idle governor shaft 210 is caused to rotate about the axis C, thereby rotating idle governor arm 212 against spring 216. Spring 216 is caused to extend until a balance is achieved between the pulling force and the feedback force. However, because idle governor arm 212 rotates back about the axis C until this balance is achieved, the driving force through idle governor link 214 is somewhat relieved for reducing the degree of throttle, thereby reducing the idle speed of engine 14.

In the event engine 14 begins to run roughly, the rotational speed of the internal components of engine 14 will decrease, thereby inducing a decreasing feedback force through idle governor shaft 210 opposing the biasing force of idle governor spring 216. As the feedback force decreases, even momentarily, idle governor spring 216 is permitted to rotate idle governor arm 212 to drive idle governor link 214 against throttle linkage 21, again increasing the idle speed of engine 14.

As described in connection with the ground speed governor system 100, as the accelerator pedal is depressed, a pulling force through throttle cable 26 is exerted upon throttle linkage 21 of carburetor 20, which causes the speed of engine 14 to increase. Typically, the increasing of the rotational speed of the internal components of engine 14 would cause an increasing feedback force through idle governor shaft 210 opposing the biasing force of idle governor spring 216 and relieving the driving force of idle governor link 214, thereby closing throttle linkage 21. However, because lost motion slot member 215 is coupled between idle governor link 214 and throttle linkage 21, this relieving of the driving force of idle governor link 214 when the speed of engine 14 is increased does not force throttle linkage 21 to be closed. Consequently, ground speed governor system 100 and engine idle speed governor system 200 can cooperate to ensure that the maximum vehicle speed is not exceed and the proper engine idle speed is maintained.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A governor system for limiting the ground speed of a vehicle and maintaining an idle speed of the vehicle, said vehicle having an engine operably coupled with a transmission, said engine having a throttle system, said governor system comprising:

a first feedback shaft operably coupled with a transmission of the vehicle to provide a first feedback torque in response to a ground speed of the vehicle;

a second feedback shaft operably coupled with the engine to provide a second feedback torque in response to a revolutionary speed of the engine;

a ground speed governor system operably connectable between said first feedback shaft and said throttle system of the engine for limiting operation of said throttle system in response to said first feedback torque; and an idle speed governor system having at least two feedback settings and operably connectable between said second feedback shaft and said throttle system of the engine for actuating said throttle system in response to said second feedback torque based on a selected setting of the at least two feedback settings.

2. The governor system according to claim 1, further comprising:

a lost motion device interconnectable between said idle speed governor system and said throttle system, said lost motion device operable to permit said ground speed governor system to operate said throttle system independently from said idle speed governor system.

3. The governor system according to claim 2 wherein said lost motion device comprises:

a generally planar member having an elongated slot, said elongated slot being sized to slidably receive a throttle linkage of said throttle system such that a driving force exerted upon said throttle linkage by said ground speed governor system is prevented from being transmitted to said idle speed governor system.

4. The governor system according to claim 3 wherein said elongated slot is further sized to exert a driving force upon said throttle linkage in response to said actuation of said idle speed governor system.

5. The governor system according to claim 3 wherein said idle speed governor system comprises:

an engine speed governor arm operably coupled to and fixed for rotation with said second feedback shaft;

an engine speed linkage member coupled between said engine speed governor arm and said lost motion device for selectively applying a first force to the throttle system as said engine speed governor arm is rotated in a first direction; and a spring applying a biasing force against said engine speed governor arm into said first direction, said biasing force balancing with said second feedback torque to limit said first force in response to said revolutionary speed of the engine.

6. The governor system according to claim 1 wherein said ground speed governor system comprises:

a ground speed governor arm fixed for rotation with said first feedback shaft;

a throttle cable coupled to said ground speed governor arm for applying a first pulling force to the throttle system as said ground speed governor arm is rotated; and an accelerator cable resiliently coupled with said ground speed governor arm for applying a second pulling force to said ground speed governor arm to induce rotation of said ground speed governor arm and apply a torque to said ground speed governor arm opposing said first feedback torque, said torque balancing with said first feedback torque to limit said first pulling force in response to said ground speed of the vehicle.

7. The governor system according to claim 6, further comprising:

a spring for resiliently interconnecting said accelerator cable and said ground speed governor arm, said spring biasing to enable balancing of said torque with said first feedback torque.

8. A governor system for limiting the ground speed of a vehicle and maintaining an idle speed of the vehicle, said vehicle having an engine operably coupled with a transmission, said engine having a throttle system, said governor system comprising:

a first feedback shaft operably coupled with a transmission of the vehicle to provide a first feedback torque in response to a ground speed of the vehicle;

a second feedback shaft operably coupled with the engine to provide a second feedback torque in response to a revolutionary speed of the engine;

a ground speed governor system operably connectable between said first feedback shaft and said throttle system of the engine for limiting operation of said throttle system in response to said first feedback torque; and an idle speed governor system operably connectable between said second feedback shaft and said throttle system of the engine via a lost motion device for actuating said throttle system in response to said second feedback torque and permitting independent operation of said ground speed governor system.

9. The governor system according to claim 8 wherein said lost motion device comprises:

a generally planar member having an elongated slot, said elongated slot being sized to slidably receive a throttle linkage of said throttle system such that a driving force exerted upon said throttle linkage by said ground speed governor system is prevented from being transmitted to said idle speed governor system.

10. The governor system according to claim 9 wherein said elongated slot is further sized to exert a driving force upon said throttle linkage in response to said actuation of said idle speed governor system.

11. The governor system according to claim 8 wherein said idle speed governor system comprises:

an engine speed governor arm fixed for rotation with said second feedback shaft;

an engine speed linkage member coupled between said engine speed governor arm and said lost motion device for selectively applying a first force to the throttle system as said engine speed governor arm is rotated in a first direction; and a spring applying a biasing force against said engine speed governor arm into said first direction, said biasing force balancing with said second feedback torque to limit said first force in response to said revolutionary speed of the engine.

12. The governor system according to claim 8 wherein said ground speed governor system comprises:

a ground speed governor arm fixed for rotation with said first feedback shaft;

a throttle cable coupled to said ground speed governor arm for applying a first pulling force to the throttle system as said ground speed governor arm is rotated; and an accelerator cable resiliently coupled with said ground speed governor arm for applying a second pulling force to said ground speed governor arm to induce rotation of said ground speed governor arm and apply a torque to said ground speed governor arm opposing said first feedback torque, said torque balancing with said first feedback torque to limit said first pulling force in response to said ground speed of the vehicle.

13. The governor system according to claim 12, further comprising:

a spring for resiliently interconnecting said accelerator cable and said ground speed governor arm, said spring biasing to enable balancing of said torque with said first feedback torque.

* * * * *